United States Patent [19]

Hervig

[11] Patent Number: 5,449,332
[45] Date of Patent: Sep. 12, 1995

[54] ROCKING PEDALS

[76] Inventor: Dana P. Hervig, 1450 102nd St. E., Inver Grove Heights, Minn. 55077

[21] Appl. No.: 311,563

[22] Filed: Sep. 23, 1994

[51] Int. Cl.$^6$ .......................... A63B 22/06; F16H 7/22
[52] U.S. Cl. ........................................ 482/57; 482/71; 74/594.4
[58] Field of Search ................ 482/57, 71, 51, 58-65; 74/594.4, 594.1, 594.2, 594.7

[56] References Cited

U.S. PATENT DOCUMENTS

| | | | |
|---|---|---|---|
| 3,834,693 | 9/1974 | Poppenberger | 482/71 |
| 4,061,046 | 12/1977 | Lang | 74/594.4 |
| 4,376,532 | 3/1983 | Hunstad | 482/71 |
| 4,599,915 | 7/1986 | Hlavac | 74/594.4 |
| 4,973,046 | 11/1990 | Maxwell | 74/594.7 |
| 5,142,938 | 9/1992 | Sampson | 74/594.4 |

*Primary Examiner*—Stephen R. Crow

[57] ABSTRACT

A rocking pedal (10) essentially comprises a lower pedal frame (12) having a side fitting (14) for rotational adaptation to a bicycle crank (16). A lower hinge (18) uses hinge pin (21) to couple with an upper hinge (20) that is fixed to the bottom of upper pedal frame (22). Cushion pads (24) are inserted between lower pedal frame (12) and upper pedal frame (22) on each side of joined lower hinge (18) and upper hinge (20) to make rocking pedal (10) more comfortable.

7 Claims, 3 Drawing Sheets

ROCKING PEDALS

TECHNICAL FIELD

This invention relates to pedals that freely rock from side to side on a heel to toe axis for weight lifting equipment and bicycles.

BACKGROUND OF THE INVENTION

Pedals on weight lifting machines in gyms and on bicycle pedals to date have been rigidly fixed from side to side or adjustable in different planes of movement to fit various fixed angles of position. Such pedals remain level or maintain a preset angle while pedaling or doing repetitions on an exercise machine. It would be desireable to have pedals that would freely rock from side to side on a heel to toe axis while pedaling or doing repetitions on an exercise machine. This would allow a user to feel side to side movement tendencies in pedals and to minimize the movement with feet to develop better muscle control. For example, if a bicycle rider pushes down on a rocking pedal and the left side of his foot rocks inward this indicates that the right side of his foot and corresponding leg muscles need to press into the pedal more to level it. A pedal that rocks to the right would indicate weakness in the user's left side that needs to be overcome to level the pedal. Pedals that rock from side to side would promote biofeedback for the user and allow the development of better coordination. The following invention substantially fills this need.

SUMMARY OF THE INVENTION

A primary object of the present invention is to provide pedals on weight lifting equipment and bicycles that will freely rock from side to side on a heel to toe axis during exercise so that the user will sense unbalanced forces when pressing against the pedals; eventually, the user will develop muscles to be able to move exercise equipment through its range of motion without having the pedals rock from side to side.

Further objects and advantages will become apparent from an example of this invention as illustrated in the accompanying drawings; it should be noted that changes in the specific construction may occur as described within the scope of the claims.

BRIEF DESCRIPTION OF THE DRAWINGS

The invention will be better understood, and objects other than those set forth above will become apparent when consideration is given to the following detailed description thereof. Such description makes reference to the drawings wherein.

REFERENCE NUMERALS IN DRAWINGS

Figure 1:
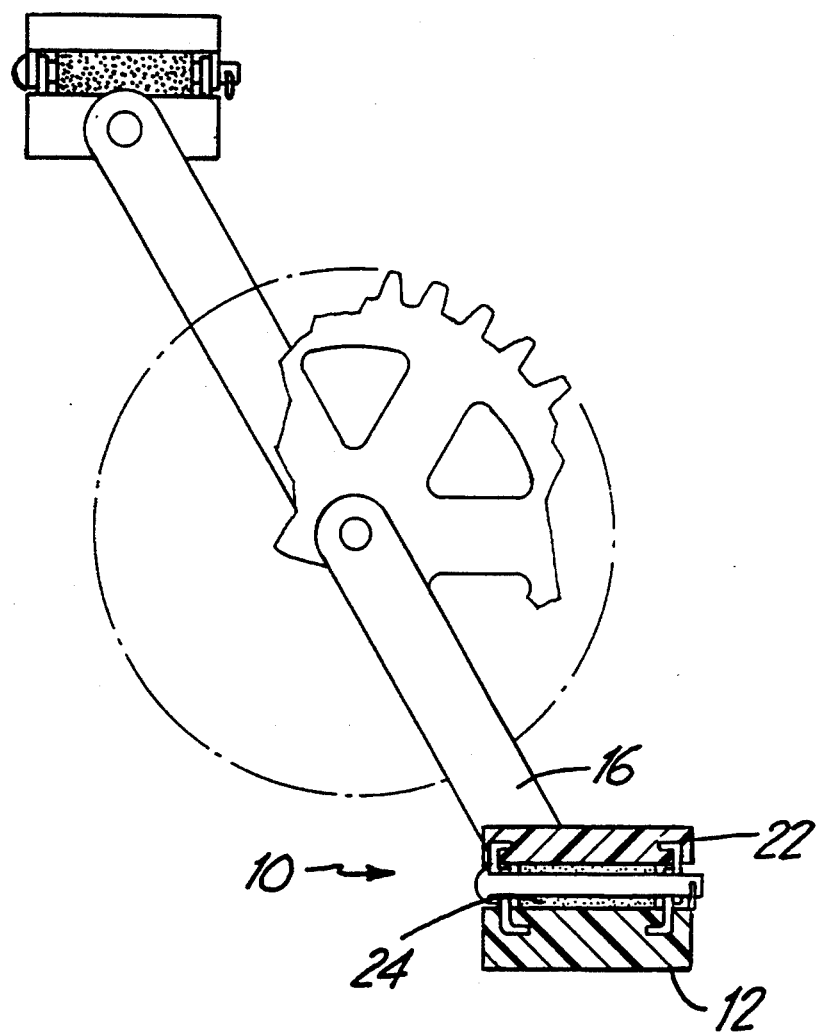
FIG. 1 is a side plan view of the mount.

10 Rocking pedal
12 Lower pedal frame
14 Side fitting
16 Bicycle crank
18 Lower hinge
20 Upper hinge
21 Hinge pin
22 Upper pedal frame
24 Cushion pads

DESCRIPTION OF THE PREFERRED EMBODIMENT

Figure 2:
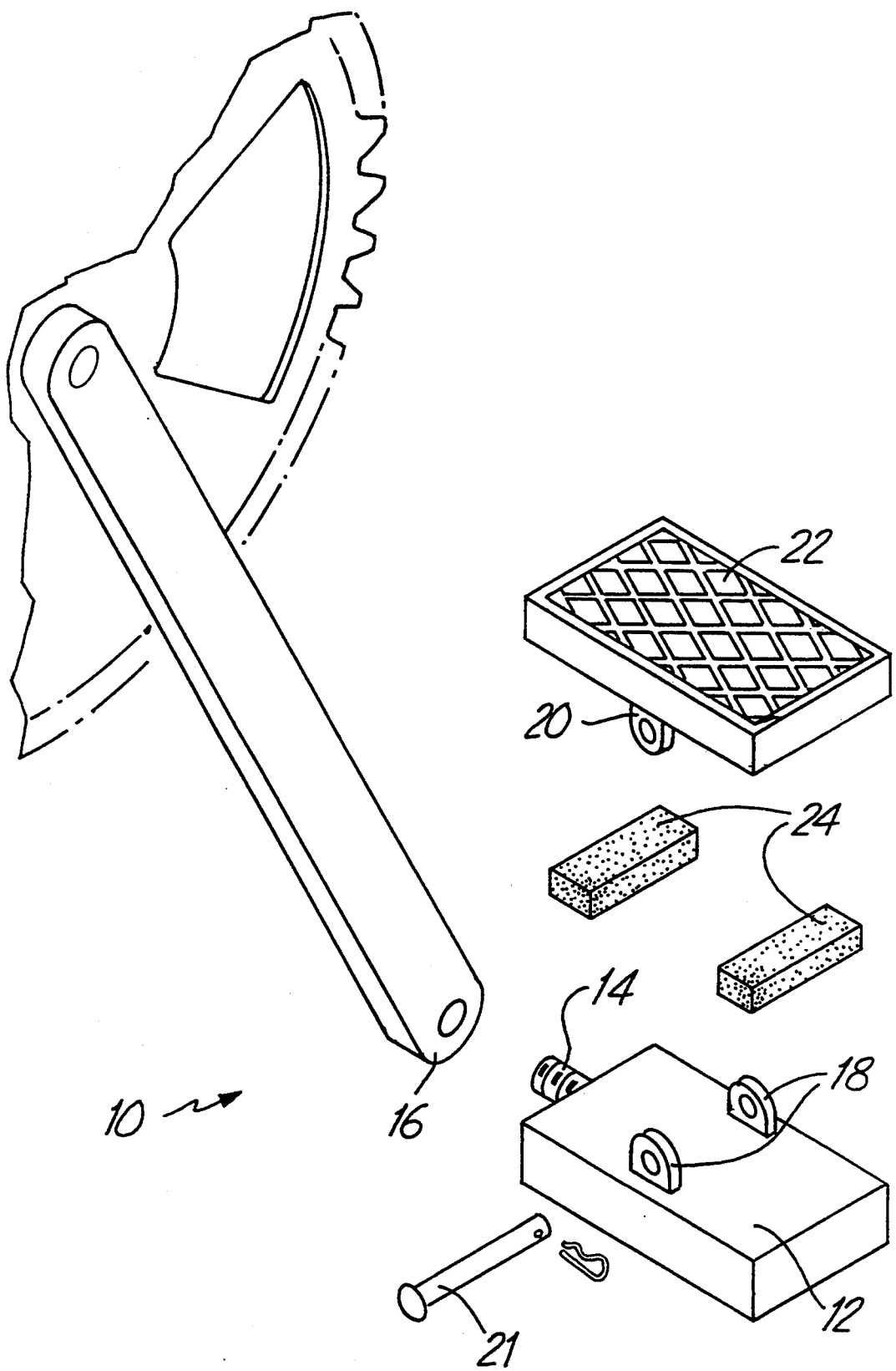
FIG. 2 is an exploded perspective view of the present invention.
Figure 3:
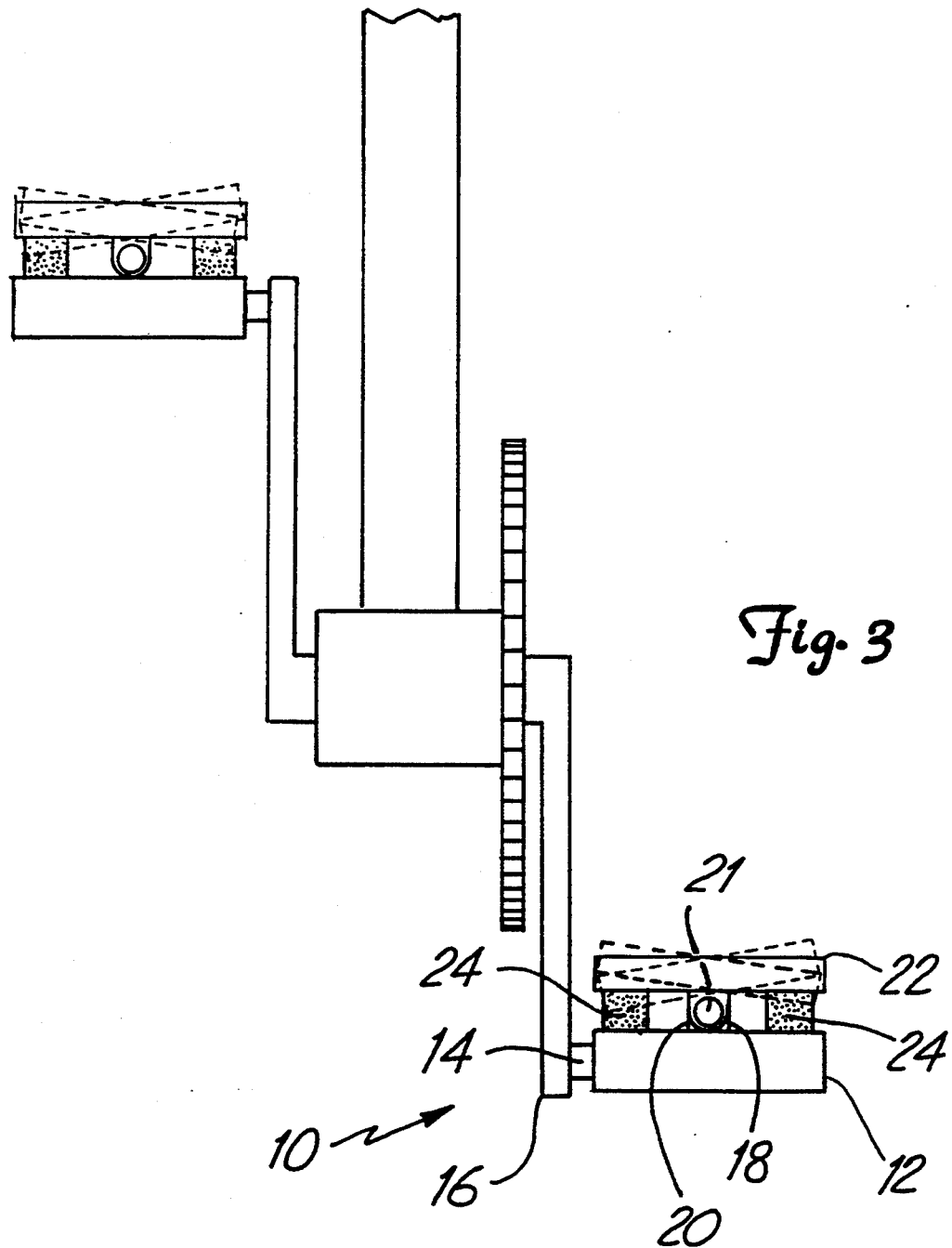
FIG. 3 is a perspective view of the apparatus in its assembled disposition.

With reference now to the drawings, and in particular to FIGS. 1 to 3 thereof, a rocking pedal embodying the principles and concepts of the present invention and generally designated by reference numeral 10 will be described.

A rocking pedal 10 essentially comprises a lower pedal frame 12 having a side fitting 14 for rotational adaptation to a bicycle crank 16. A lower hinge 18 on pedal frame 12 uses hinge pin 21 to couple with an upper hinge 20 that is fixed to the bottom of upper pedal frame 22. Cushion pads 24 are inserted between lower pedal frame 12 and upper pedal frame 22 on each side of joined lower hinge 18 and upper hinge 20 to make rocking pedal 10 more comfortable. Assembled rocking pedal 10 will rock from side to side on a heel to toe axis that extends through hinge pin 21.

I claim:

1. A rocking pedal comprising:
   (a) a shaft having first and second oppositely disposed ends, and an axis extending through the first end and the second end, the first end being connectable to a bicycle crank;
   (b) a lower pedal frame rotatably mounted to said shaft about the axis of said shaft; and
   (c) an upper pedal frame pivotally mounted on said lower pedal frame along an axis substantially perpendicular to the axis of said shaft.

2. The rocking pedal according to claim 1, further comprising a cushion pad between said lower pedal frame and said upper pedal frame for providing cushioning when said upper pedal frame is pivoted relative to said lower pedal frame.

3. The rocking pedal according to claim 1, wherein said upper pedal frame is pivotally mounted on a hinge pin which is constructed and arranged substantially perpendicular to the axis of said shaft.

4. The rocking pedal according to claim 3, wherein said upper pedal further includes upper hinges mounted on the hinge pin, and said lower pedal includes lower hinges mounted on the hinge pin.

5. An apparatus comprising:
   (a) a crank;
   (b) a shaft having first and second oppositely disposed ends, and an axis extending through the first end and the second end, the first end being connected to said crank;
   (c) a lower pedal frame rotationally mounted on said shaft about the axis of said shaft; and
   (d) an upper pedal frame pivotally mounted on said lower pedal frame along an axis substantially perpendicular to the axis of said shaft.

6. The apparatus according to claim 4, wherein said apparatus is a bicycle.

7. The apparatus according to claim 4, wherein said apparatus is an exercise machine.

* * * * *